US011941653B2

(12) United States Patent
Henderson et al.

(10) Patent No.: US 11,941,653 B2
(45) Date of Patent: *Mar. 26, 2024

(54) METHODS AND SYSTEMS FOR TESTING AND APPLYING CODES TO ELECTRONIC SHOPPING CARTS

(71) Applicant: CAPITAL ONE SERVICES, LLC, McLean, VA (US)

(72) Inventors: William George Henderson, Austin, TX (US); Robert Duke, Austin, TX (US)

(73) Assignee: Capital One Services, LLC, McLean, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/364,290

(22) Filed: Jun. 30, 2021

(65) Prior Publication Data

US 2021/0326919 A1  Oct. 21, 2021

Related U.S. Application Data

(63) Continuation of application No. 16/387,121, filed on Apr. 17, 2019, now Pat. No. 11,087,348.

(51) Int. Cl.
*G06Q 30/0207*  (2023.01)
*G06Q 30/0601*  (2023.01)

(52) U.S. Cl.
CPC ..... *G06Q 30/0222* (2013.01); *G06Q 30/0641* (2013.01)

(58) Field of Classification Search
CPC ........ G06Q 30/0641; G06Q 30/0207–30/0277
See application file for complete search history.

(56) References Cited

U.S. PATENT DOCUMENTS 7,318,049 B2 * 1/2008 Iannacci ............... G06Q 20/10
                                                                  705/41
9,679,296 B2 * 6/2017 Lemphers ............ H04L 67/02
(Continued)

FOREIGN PATENT DOCUMENTS

AU        2013200110 A1       7/2013
CN         110111107 A  *     8/2019    ........... G06Q 20/387
WO     WO-2020047561 A1 *     3/2020    ......... G06Q 30/0222

OTHER PUBLICATIONS

Nielsen, Jakob, "Response Times: The 3 Important Limits", Nielsen Norman Group, Jan. 1, 1993, archived at https://web.archive.org/web/20150227223552/http://www.nngroup.com:80/articles/response-times-3-important-limits (Year: 1993).*
(Continued)

*Primary Examiner* — Kambiz Abdi
*Assistant Examiner* — Scott Snider
(74) *Attorney, Agent, or Firm* — Bookoff McAndrews, PLLC

(57) ABSTRACT

Disclosed are methods, systems, and non-transitory computer-readable medium for testing and applying codes to electronic shopping carts. For instance, the method may include monitoring a shopping cart associated with an e-commerce website and with a user; in response to detecting a change to the shopping cart, testing codes with respect to a present content of the shopping cart to determine valid codes; selecting at least one of the valid codes; determining a status of the session; and performing an action based on the status and the at least one selected code. The testing the codes with respect to the present content of the shopping cart may include: cloning the shopping cart to form a cloned shopping cart in a shadow session; and/or obtaining the codes; and testing the codes on the cloned shopping cart in the shadow session to determine the valid codes.

20 Claims, 8 Drawing Sheets

(56) References Cited

U.S. PATENT DOCUMENTS

| | | | |
|---|---|---|---|
| 9,922,327 B2 | 3/2018 | Johnson et al. | |
| 10,303,133 B1* | 5/2019 | Dhalla | G06Q 10/087 |
| 10,475,071 B2* | 11/2019 | Mezzacca | G06Q 20/387 |
| 10,592,915 B2* | 3/2020 | Lemphers | G06Q 30/0248 |
| 10,607,246 B2* | 3/2020 | Lemphers | H04L 67/02 |
| 10,614,476 B2* | 4/2020 | Hudson | G06Q 30/0229 |
| 10,679,233 B2* | 6/2020 | Hudson | G06Q 30/02 |
| 10,685,368 B1* | 6/2020 | Hudson | G06Q 30/0239 |
| 10,719,843 B2* | 7/2020 | Hudson | G06Q 30/02 |
| 10,726,437 B2* | 7/2020 | Hudson | G06Q 30/0239 |
| 10,922,710 B2* | 2/2021 | Lemphers | G06Q 30/0277 |
| 11,625,742 B2* | 4/2023 | Hudson | G06Q 30/0222 705/14.23 |
| 2002/0143612 A1* | 10/2002 | Barik | G06Q 30/0222 705/14.23 |
| 2003/0004798 A1* | 1/2003 | McAuliffe | G06Q 30/0601 705/26.1 |
| 2010/0191582 A1* | 7/2010 | Dicker | G06Q 30/0631 705/26.1 |
| 2011/0153401 A1* | 6/2011 | Jellema | G06Q 30/02 705/14.26 |
| 2013/0080235 A1* | 3/2013 | Wolfe | G06Q 30/0222 705/14.26 |
| 2013/0117094 A1* | 5/2013 | Jones | G06Q 30/0222 705/14.35 |
| 2014/0046794 A1* | 2/2014 | Vallery | G06Q 30/0631 705/26.7 |
| 2014/0074584 A1 | 3/2014 | Fisher | |
| 2014/0114755 A1 | 4/2014 | Mezzacca | |
| 2014/0122203 A1* | 5/2014 | Johnson | G06Q 30/0641 705/26.8 |
| 2014/0200977 A1* | 7/2014 | Choong Cheng Shien | G06Q 30/0222 705/14.23 |
| 2015/0134442 A1* | 5/2015 | Shekhar | G06Q 30/0239 705/14.39 |
| 2016/0180366 A1* | 6/2016 | Ben-Eliezer | G06Q 30/0222 705/14.23 |
| 2016/0180436 A1* | 6/2016 | Arana | G06F 21/33 705/14.23 |
| 2017/0148046 A1 | 5/2017 | Akbarpour Mashadi et al. | |
| 2017/0186027 A1* | 6/2017 | Hudson | G06Q 30/0222 |
| 2019/0102784 A1 | 4/2019 | Chen et al. | |
| 2019/0114488 A1* | 4/2019 | Glazer | G08B 13/2402 |
| 2019/0197307 A1 | 6/2019 | Yeh et al. | |
| 2019/0318375 A1 | 10/2019 | Choi | |
| 2020/0320468 A1* | 10/2020 | Clayton | G06Q 30/06 |

OTHER PUBLICATIONS

Kuo, Benjamin F., "How Honey Offers A Shortcut To Savings, with Ryan Hudson", socaltech.com, Dec. 19, 2012 archived on Jan. 1, 2013, https://web.archive.org/web/20130101022253/https://www.socaltech.com/how_honey_offers_a_shortcut_to_savings_with_ryan_hudson/s-0046862.html (Year: 2012).*

K. G. Javkar, S. H. Vora, A. S. Rodge, J. Bose and H. Sharma, "Best offer recommendation service," 2016 International Conference on Advances in Computing, Communications and Informatics (ICACCI), Jaipur, India, 2016, pp. 2430-2436, doi: 10.1109/ICACCI.2016.7732421 (Year: 2016).*

Oliver, R.L. and Shor, M. (2003), "Digital redemption of coupons: satisfying and dissatisfying effects of promotion codes", Journal of Product & Brand Management, vol. 12 No. 2, pp. 121-134. https://doi.org/10.1108/10610420310469805 (Year: 2003).

Kukar-Kinney, Monika et al. "The Determinants of Consumers' Online Shopping Cart Abandonment." Journal of the Academy of Marketing Science 38.2 (2010): 240-250. Web. (Year: 2010).

* cited by examiner

US 11,941,653 B2

METHODS AND SYSTEMS FOR TESTING AND APPLYING CODES TO ELECTRONIC SHOPPING CARTS

CROSS-REFERENCE TO RELATED APPLICATION(S)

This patent application is a continuation of U.S. patent application Ser. No. 16/387,121, filed on Apr. 17, 2019, the entirety of which is incorporated herein by reference.

TECHNICAL FIELD

Various embodiments of the present disclosure relate generally to methods and systems for testing and applying codes to electronic shopping carts and, more particularly, to methods and systems for testing codes before checking out and applying codes to electronic shopping carts.

BACKGROUND

Generally, customers (or a browser extension of a browser for the customers) apply coupon or promotional codes to test the codes on e-commerce websites during a checkout process. However, applying the codes to test the codes during the checkout process may cause delays during the checkout process. For instance, delays may be caused by requiring the customer to be at an appropriate step in the checkout process to test the codes, may require the customer to manually enter and remove codes one at a time in order to compare a potential value of the codes, and since the testing the codes may require a certain amount of time, the entire checkout process may be delayed by the certain amount of time.

The present disclosure is directed to overcoming one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

According to certain aspects of the disclosure, systems and methods are disclosed for testing and applying codes to electronic shopping carts.

For instance, a method for testing and applying codes to electronic shopping carts may include monitoring a shopping cart associated with an e-commerce website and with a user, the shopping cart being associated with a session of the user; in response to detecting a change to the shopping cart, testing codes with respect to a present content of the shopping cart to determine valid codes, the codes being associated with the e-commerce website; selecting at least one of the valid codes as at least one selected code based on a result of the testing the codes; determining a status of the session; and performing an action based on the status and the at least one selected code.

A system for testing and applying codes to electronic shopping carts may include a memory storing instructions; and a processor executing the instructions to perform a process. The process may include: determining whether a user is viewing an e-commerce website; in response to determining that the user is viewing the e-commerce website, setting up cart listeners; using the cart listeners, monitoring a shopping cart associated with the e-commerce website and with the user, the shopping cart being associated with a session of the user; in response to detecting a change to the shopping cart, testing codes with respect to a present content of the shopping cart to determine valid codes, the codes being associated with the e-commerce website; selecting at least one of the valid codes as at least one selected code based on a result of the testing the codes; determining a status of the session; and performing an action based on the status and the at least one selected code.

A method for testing and applying codes to electronic shopping carts may include monitoring a shopping cart associated with an e-commerce website and with a user, the shopping cart being associated with a session of the user; in response to detecting a change to the shopping cart, testing codes with respect to a present content of the shopping cart to determine valid codes, the codes being associated with the e-commerce website, selecting at least one of the valid codes as at least one selected code based on a result of the testing the codes; determining a status of the session; and performing an action based on the status and the at least one selected code. The testing the codes with respect to the present content of the shopping cart may include: cloning the shopping cart to form a cloned shopping cart in a shadow session using the present content; obtaining the codes; and testing the codes on the cloned shopping cart in the shadow session to determine the valid codes.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
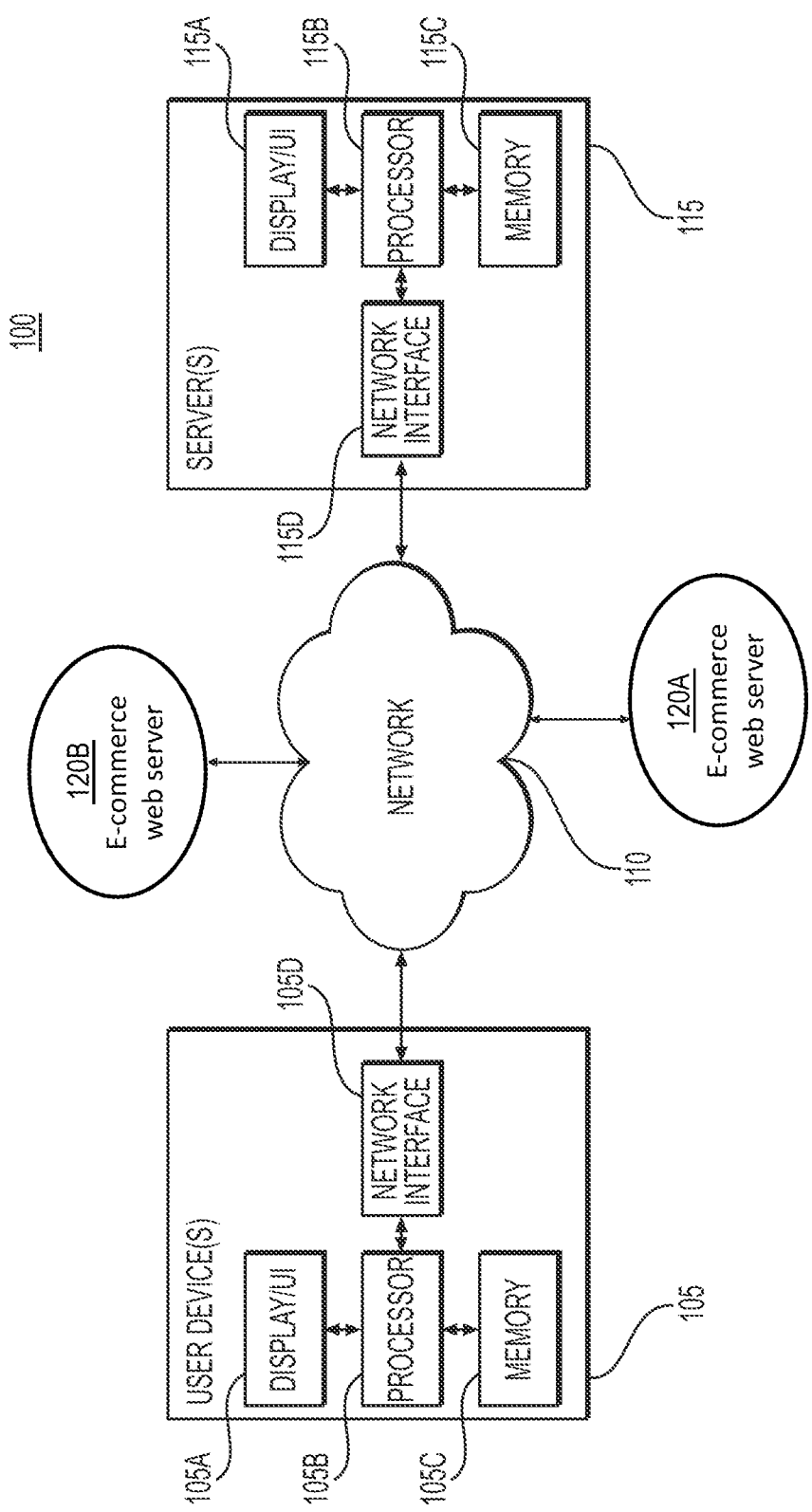
FIG. 1 depicts an exemplary system for testing and applying codes to electronic shopping carts, according to one or more embodiments.

Various embodiments of the present disclosure relate generally to methods and systems for testing and applying codes to electronic shopping carts and, more particularly, to methods and systems for testing codes before checking out and applying codes to electronic shopping carts.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

In general, the present disclosure is directed to methods and systems for testing codes before checking out and applying codes to electronic shopping carts. For instance, as discussed in more detail herein, a system of the present disclosure may automatically apply selected coupon code(s) to a shopping cart as the user shops. The system of the present disclosure may apply the selected coupon code without displaying any webpages or information to the user (e.g., in a headless manner). The system of the present disclosure may detect when a user's shopping cart changes, clone the user's shopping cart in a new session, and test coupon codes against the cloned shopping cart in the new session to find valid codes for the website and/or items in the cloned shopping cart. The system of the disclosure may also apply one or more of the valid codes to the user's shopping cart automatically in the background; and show a savings summary of the codes applied and/or tested and which ones were applied or should be applied. Therefore, the system of the present disclosure may allow for codes to be tested at a time an item is added to cart, or in some cases even before. The system of the present disclosure may, by trying codes automatically as the user's shopping cart changes before a user gets to checkout, allow for a faster checkout experience, and/or create an incentive to complete a purchase if savings are available. Furthermore, the system of the present disclosure may, by using the new session and the cloned shopping cart, also avoid conflicts with the user's shopping cart, thereby reducing issues for users.

FIG. 1 depicts an exemplary system 100 for testing and applying codes to electronic shopping carts, according to one or more embodiments. The system 100 may include one or more user device(s) 105, a network 110, one or more server(s) 115, and one or more e-commerce servers, such as, for example, e-commerce servers 120A and 120B. The user device 105, the server 115, and the plurality of e-commerce servers 120A and 120B may be connected via the network 110, using one or more standard communication protocols. The network 110 may be one or a combination of the internet, a local network, or other network. The user device 105 and the server 115 may transmit and receive messages from each other across the network 110.

The server 115 may include a display/UI 115A, a processor 115B, a memory 115C, and/or a network interface 115D. The server 115 may be a computer, system of computers (e.g., rack server(s)), or a cloud service computer system. The server 115 may execute, by the processor 115B, an operating system (O/S) and at least one instance of a code management program (each stored in memory 115C). The code management program may provide information to and/or perform processing for one or more user devices, such as the user device 105, as discussed in more detail below. The memory 115C may also store the code management program, e-commerce website information, and/or code information. The e-commerce website information may include information regarding e-commerce websites for which the code management program is capable of testing and applying codes for the user device 105. The code information may include information for a plurality of codes (e.g., coupon or promotional codes) associated with one or more e-commerce websites hosted by one or more of the e-commerce servers 120A an 120B. The display/UI 115A may be a touch screen or a display with other input systems (e.g., mouse, keyboard, etc.) for an operator of the server 115 to control the functions of the server 115 (e.g., update the code management program, the e-commerce website information, and/or the code information). The network interface 115D may be an TCP/IP network interface for, e.g., Ethernet or wireless communications with the network 110.

The user device 105 may include a display/UI 105A, a processor 105B, a memory 105C, and/or a network interface 105D. The user device 105 may be a computer, a cell phone, a tablet, etc. The user device 105 may execute, by the processor 105B, an operating system (O/S) and at least one application (each stored in memory 105C). The application may be a browser program or a mobile application program (which may also be a browser program in a mobile O/S). The application may generate one or more graphic user interfaces (GUIs) based on instructions/information stored in the memory 105C and/or instructions/information received from the server 115 and/or the plurality of e-commerce servers 120A and/or 120B. The GUIs may, for instance, be webpages executed based on HTML, CSS, and/or scripts, such as JavaScript, but one skilled in the art would recognize that this may be accomplished by other methods, such as XML and Android programming languages or Objective-C/Swift. The display/UI 105A may be a touch screen or a display with other input systems (e.g., mouse, keyboard, etc.). The network interface 105D may be an TCP/IP network interface for, e.g., Ethernet or wireless communications with the network 110. The processor 105B, while executing the application, may receive user inputs from the display/UI 105A, and perform actions or functions in accordance with the application.

The application (e.g., a browser program) may be a software application that may be used by a user to access and interact with websites hosted by one or more of the plurality of e-commerce servers 120A and 120B over network 110. In at least one embodiment, a user may view and interact with the websites hosted by one or more of the plurality of e-commerce servers 120A and 120B via the application, for example, by clicking on links or graphical user elements to view items and to place items in an electronic shopping cart. In other embodiments, any suitable app (software application) or other component may be used in place of the application.

In at least one embodiment, the application may include a browser extension (or plug-in) which performs certain functions, in accordance with the system and methods described herein. For example, as described in more detail below, in at least one embodiment, the browser extension may record requests made during interactions between the application and one or more of the plurality of e-commerce web servers 120A and 120B (and/or between the application and the server 115) and/or record user inputs on graphical user elements of GUIs. Alternatively, such operations may be performed by another component that need not be a part of the application. In at least one embodiment, the browser extension or another software application may run in the background regardless of whether the application is running (e.g., a background application). The background application may thereby see and record any relevant interactions with websites hosted by the e-commerce web servers 120A and 120B, regardless of which software is being used to perform the interactions.

In at least one embodiment, the browser extension may include an analysis tool. The analysis tool may be used to interpret and filter the recorded interactions or user inputs on graphical user elements associated with web pages hosted by the e-commerce web servers 120A and 120B. The analysis tool may run on another device, such as the server 115, or any other client device communicatively coupled to the server 115.

In at least one embodiment, the browser extension may also include a request identification program. The request identification program may review recorded requests or user inputs on graphical user elements associated the with web pages, and identify those that are necessary to complete process flows. The request identification program may run on another device, such as the server 115 or any other client device communicatively coupled to the server 115.

In at least one embodiment, the browser extension may also include an automated site navigation program. The automated site navigation program may automatically extract information from various websites (such as those hosted by the e-commerce web servers 120A and 120B) without the need for rendering on a display, such as the display/UI 105A. The automated site navigation program may also automatically transmit requests to, receive responses from, and process the responses of the e-commerce servers 120A and 120B, as discussed in more detail below. In at least one embodiment, the automated site navigation program may operate using information generated by the analysis tool and the request identification program, based on recorded interactions with web pages hosted by the e-commerce web servers 120A and 120B. In at least one embodiment, the automated site navigation program may function on the user device 105; alternatively, the automated site navigation program may be implemented on a separate device, such as the server 115. In at least one embodiment, the automated site navigation program operates without any need for human interaction.

The browser extension may also include a code testing and applying program. The code testing and applying program may, while a user is navigating an e-commerce website, test codes to determine whether any codes are valid codes which may be used with respect to a given composition or content of a shopping cart. A shopping cart may be a server/browser hosted software-based mechanism to select goods (tangible or intangible) and/or services for eventual purchase/rental through an e-commerce website hosted by an e-commerce server. The shopping cart may include checkout queues, baskets, wish lists, etc. The composition of the shopping cart may be based on a current shopping cart of the user, or it may be based on a likely future shopping cart of the user (e.g., a user has viewed a type of product, a specific product, etc., and is likely to add the product to the shopping cart). Specifically, the browser extension may perform a code testing process, in accordance with the code testing and applying program, to determine valid codes for an e-commerce website.

The browser extension may determine whether a user is viewing an e-commerce website hosted by one of the plurality of e-commerce servers 120A and 120B. For instance, the browser extension may determine the user navigated to a website included in the e-commerce website by, e.g., monitoring network requests sent by the user device 105 and/or analyzing a uniform resource locator (URL) of a currently accessed webpage (e.g., displayed or loaded in a tab of a browser). The browser extension may determine the user is viewing the website by one or more of: determining the user has accessed a webpage of a website included in the e-commerce website information; determining the user is viewing the accessed webpage based on a currently displayed GUI; and/or determining the user device 105 has transmitted network requests and/or received user inputs on graphical user elements associated with the website. For instance, network requests and/or URLs may be searched for text strings that match one or more e-commerce websites (included in the e-commerce website information) hosted by the one or more e-commerce servers 120A and 120B. As one example, the matching may be performed by regular expression processing on each network request and/or URL transmitted/accessed by the user device 105. The e-commerce website information may be obtained by the browser extension from the server 115. The server 115 may update the e-commerce website information periodically or in response to changes in the information of e-commerce website information. The server 115 may transmit the updates to the e-commerce website information to the user device 105 for the browser extension.

The browser extension may, in response to determining that the user is viewing the e-commerce website, set up cart listeners. For instance, the cart listeners (which may include checkout listeners) may be event monitoring programs that may detect changes to a shopping cart of an e-commerce website and/or detect when a checkout process starts/has started. The cart listeners/checkout listeners may be custom for each e-commerce website or may be the same for each e-commerce website. The cart listeners/checkout listeners may be obtained from the server 115 and/or generated based on information in the e-commerce website information, such as specific network requests, responses, etc. for a specific e-commerce website.

The browser extension may, using the cart listeners, monitor a shopping cart associated with the e-commerce website and with the user and/or, using the checkout listeners, monitor a checkout process of e-commerce website. The shopping cart may be associated with a session of the user.

The cart listeners may monitor network requests and/or responses, and analyze the network requests and responses to determine whether items were added, deleted, and/or modified in a user's shopping cart; the checkout listeners may analyze the network requests and responses to determine whether a checkout process has started. Additionally or alternatively, the cart listeners may monitor user inputs and analyze the user inputs for user inputs on graphical user elements (e.g., HTML elements, DOM elements, etc.) that may add, delete, and/or change an item in a user's shopping cart; the checkout listeners may analyze the user inputs for user inputs on the graphical user elements to determine whether a checkout process has started. For instance, the network requests, responses, and/or the user inputs on graphical user elements may be identified based on information from the request identification program or analysis tool, discussed above, or from information included in the e-commerce website information. Specifically, the information may include a plurality of expressions included in network requests and/or responses that indicate an add, delete, or modify item action for the user's shopping cart for the e-commerce website (or to start a checkout process); the information may also include a plurality of user inputs on graphical user elements that indicate an add, delete, or modify item action for the user's shopping cart for the e-commerce website (or to start a checkout process).

Additionally or alternately, the cart listeners may, periodically, in response to a user input on a graphical user element and/or a user navigating to a different URL (e.g., by a network request), transmit a request to a cart API or transmit a request for a cart HTML page of the e-commerce website hosted by the e-commerce server 120A or 120B. The browser extension may include, in the request to the cart API or for the cart HTML page, information indicating the session of the user. In response, the browser extension may receive information from the cart API or for the cart HTML page, and determine whether the user's shopping cart has been updated to add, delete, or modify an item. For instance, the cart listeners may invoke the automated site navigation program to perform this process, with or without being displayed to the user.

Alternatively, the browser extension may have set up the cart listeners already or set up the cart listeners after the user has added one or more items to the user's shopping cart. For instance, the browser extension may dynamically determine when to set up the cart listeners based on statistical analysis of previous user interactions with e-commerce website(s).

The browser extension may, in response to a trigger condition occurring, such as detecting a change to the shopping cart, perform the code testing process. The code testing process may test codes with respect to a present content of the shopping cart to determine the valid codes. Generally, a trigger condition may be when an item is added, deleted, or modified in a user's shopping cart, as indicated by the cart listeners. Additionally or alternatively, the trigger condition may be an expiration of a timer or may be based on a request from the server 115 to perform the code testing process (e.g., if one or more codes have expired or one or more new codes are available). The cart listeners may report the trigger condition to the browser extension. The browser extension may initiate (or start) the code testing process in response to the trigger condition occurring.

The codes may be associated with the e-commerce website. For instance, the code information may be obtained by the browser extension from the server 115. The code information may include codes from a third party (e.g., a service that aggregates codes for e-commerce websites), codes scraped from the internet, codes that have been successfully used by users of the browser extension and/or the server 115 (e.g., crowd sourced codes), and/or personal codes of the user. The server 115 may collect the codes and provide the code information to the browser extension. For instance, the server 115 and/or the browser extension may access a user's e-mail account, find e-mails from e-commerce websites that include personal codes (e.g., single-use codes, special codes, codes only usable by the user, etc.), extract the personal codes from the e-mails from e-commerce websites, and (by the browser extension) use the personal codes in the code testing process.

The code testing process may obtain data for the user's shopping cart; determine the present content of the shopping cart based on the data; determine whether the present content has been tested before; and, in response to determining the present content has been tested before, retrieve the valid codes from a memory, such as the memory 105C. For instance, the browser extension may store results of previous cart testing for a predetermined period of time in the memory 105C, and the browser extension may retrieve the stored results.

In one aspect of the disclosure, the browser extension, before retrieving the valid codes, may determine whether a cart expiration timer has expired. In response to determining that the cart expiration timer has not expired, the browser extension may then retrieve the valid codes from the memory, such as the memory 105C. In response to determining that the cart expiration timer has expired, the browser extension may proceed, as discussed below, as if the present content has not been tested before. In this manner, the browser extension may double check that the codes are still valid, as codes may have stopped being valid, or the codes may have changed to provide different savings or other transaction details.

To obtain the data for the user's shopping cart, the browser extension may transmit a request to a cart API or transmit a request for a cart HTML page of the e-commerce website hosted by the e-commerce server 120A or 120B. In response, the browser extension may receive information from the cart API or for the cart HTML page, and determine the present content of user's shopping cart. For instance, the browser extension may invoke the automated site navigation program to perform this process, with or without being displayed to the user.

To determine the present content of the shopping cart based on the data, the browser extension may identify items in the user's shopping cart, collect item data, quantity, and identifiers of items (collectively, present cart configuration information), based on the received information from the cart API or for the cart HTML page. For instance, the browser extension may invoke the automated site navigation program to perform this process, with or without being displayed to the user. The browser extension (or the automated site navigation program) may parse marked up data and/or formatted data of the received information from the cart API or for the cart HTML page to extract the present content of the user's shopping cart as the present cart configuration information.

To determine whether the present content has been tested before, the browser extension may search previously tested shopping cart configurations, and determine if any of the previously tested shopping cart configurations match the present cart configuration information. The previously tested shopping cart configurations may be stored on the memory 105C or on the server 115 and, if stored on the server 115, the browser extension may transmit a request to the server 115 to determine if the present content of the user's shopping cart has been tested before. The previously tested shopping cart configurations may be stored in a data structure with a format to enable matching of items, item data, quantity, and/or identifiers of items of the present cart configuration information and/or the e-commerce website associated with the user's shopping cart. The previously tested shopping cart configurations may also include one or more of: an identifier of the tested shopping cart, valid codes associated with the tested shopping cart, a date and/or time of testing, and/or an expiration time or timer for the tested shopping cart. To retrieve the valid codes from the memory, the browser extension may retrieve the valid codes associated with the tested shopping cart that matches the present cart configuration information from the previously tested shopping cart configurations.

In this manner, the browser extension may exit the code testing process early and return the valid codes to apply to the user's shopping cart. For instance, this may reduce overall processing time, network requests/responses being transmitted, and/or processing load of the user device 105/ server 115.

The browser extension may clone the user's shopping cart to form a cloned shopping cart in a shadow session using the present content. For instance, the browser extension may clone the user's shopping cart to form the cloned shopping cart in the shadow session using the present content, in response to: (1) determining the present content has not been tested before (or the expiration timer has expired), and/or (2) new code events. The browser extension may determine the new code events based on (1) messages from the server 115 indicating the availability of new codes associated with the e-commerce website, (2) user inputs to the user device 105 indicating the availability of new codes associated with the e-commerce website, and/or (3) the browser extension retrieving new personal codes from e-mails associated with the e-commerce website in the user's e-mail account. Therefore, the code testing may be performed, even if the cart has not changed or expired.

The browser extension may then test the codes on the cloned shopping cart in the shadow session to determine the valid codes. A shadow session may be a session distinct and separate from the session associated with the user, between the browser extension and the e-commerce server 120A or 120B that hosts the e-commerce website. The shadow session may be processed in a background of the application such that a user may not see associated webpages, graphics, or information. The browser extension may invoke the automated site navigation program to perform the process to test the codes on the cloned shopping cart in the shadow session. To clone the user's shopping cart as a cloned shopping cart, the browser extension may add, delete, or modify items of another shopping cart in the shadow session so that the another shopping cart (e.g., the cloned shopping cart) corresponds to the present content of the user's shopping cart.

To test the codes on the cloned shopping cart in the shadow session, the browser extension (or the automated site navigation program in accordance with instructions from the browser extension) may: determine whether at least one code of the codes has been tested; in response to determining that at least one code of the codes has not been tested, select one or more codes of the at least one code that has not been tested; and apply the one or more codes (separately, in combination, in series, or any combination thereof) to the cloned shopping cart in the shadow session to determine whether the one or more codes are valid codes.

To apply a code to the cloned shopping cart in the shadow session to determine whether the code is a valid code, the browser extension may: transmit to the e-commerce website a request to apply the code to the cloned shopping cart in the shadow session; receive a response from the e-commerce website; and process the response from the e-commerce website to determine whether the code is a valid code. One of skill in the art would recognize that the code may not be necessarily limited to one code, but instead may be a combination of codes (e.g., a first code that may provide a discount and a second code that may provide free shipping).

To transmit the request, the browser extension may generate the request in accordance with information from the request identification program or the analysis tool and/or from the e-commerce website information. For instance, the request may be specifically formatted in accordance with an API call of a cart API of the e-commerce website or may be a specifically formatted HTTP request. The browser extension may then transmit the generated request to the e-commerce server 120A or 120B associated with the e-commerce website.

To process the response from the e-commerce website to determine whether the code is a valid code, the browser extension may parse marked up data and/or formatted data of the response, in accordance with information from the request identification program or the analysis tool and/or from the e-commerce website information. For instance, the response may be specifically formatted in accordance with an API response of the cart API, the response may be text in HTML/CSS format, or the response may be in a data structure, such as JSON. In any of these cases, the response may be parsed according to the information from the request identification program or the analysis tool and/or from the e-commerce website information. The browser extension may then extract transaction data from the parsed marked up data and/or formatted data of the response, and determine transaction results based on the extracted transaction data. To extract transaction data, the browser extension may find and extract phrases of text and/or elements of the parsed marked up data and/or formatted data, based on predetermined structures of the marked up data and/or formatted data.

For instance, the information from the request identification program or the analysis tool and/or from the e-commerce website information may indicate that an HTML/CSS response may include a section in a body in a table format with an indicator confirming successful code application, previous cost, current cost, taxes (if any), shipping, warranties, availability, expected shipping/arrival date, etc. (transaction details). Likewise, an API response may include a formatted data structure that indicates the same types of transaction details.

To determine the transaction results based on the extracted transaction data, the browser extension may compare a prior state to a current state of the cloned shopping cart (e.g., before and after the code was applied to the cloned shopping cart). The browser extension may compare the prior state to the current state by comparing the transaction details, and determining if there are any differences between the transactions details. As an example, the prior state may have higher cost than the current state, if the code applies a discount coupon to the cloned shopping cart. In this manner, the browser extension may determine whether the code effects any change to the state of the cloned shopping cart. Generally, the code may be considered a valid code if the code causes a change to the state of the cloned shopping cart; however, the browser extension may also only consider codes that benefit the user in one or more ways as valid codes. Based on the comparison, the browser extension may generate the transaction results to indicate whether the code is a valid code. Furthermore, when the transaction results indicate that the code is the valid code, the browser extension may include in the transaction results further information regarding discounts, shipping information, and/or other transaction details.

Additionally or alternatively, the browser extension may transmit a request to delete the code from the cloned shopping cart. For instance, this may make testing a next code easier (e.g., faster) or may reduce a likelihood of accidently holding a reserved use of the code from interfering with the user's ability to use the code. The browser extension may then proceed to store the applied-code results in a memory, such as the memory 105C. The applied-code results may include the transaction results, the transaction details, and information for the present content of the cloned shopping cart. The stored applied-code result may be used to form the previously tested shopping cart configurations discussed above.

The browser extension may generate a result of the testing the codes. For instance, the browser extension may generate the result of the testing the codes, in response to (1) testing all of the codes associated with the e-commerce website (or one, two, or some integer number less than all of the codes that are available for the e-commerce website) on the cloned shopping cart in the shadow session, (2) determining a threshold number of codes have been tested, and/or (3) determining a subset of all the codes have been tested. The threshold number of codes may be set to reduce processing load and/or duplicative results. The subset of codes may be selected according to meta-data and/or description data associated with codes (e.g., expected discounts, expected shipping benefits, and/or transaction benefits) to select codes for the subset of codes that have potential greater user benefit. For instance, the browser extension may select a first code to be tested in the sub-set of codes that has a higher discount than a second code (with or without taking into account other restrictions/conditions/limitations on the use of either the first code or the second code). Therefore, the browser extension may test codes that may have a greater potential user benefit, and avoid testing remaining codes unless one or more of the subset of codes are not valid codes. In this manner, the browser extension may reduce processing load and/or network requests to perform the testing of codes.

The result of testing the codes may include none, one, or a plurality of valid codes, along with information associated with the valid codes. The information associated with the valid codes may include an identifier and/or a summary of transaction details for each valid code. The identifier may be a text string corresponding to the valid code, such as a text string to be entered to obtain the discount, free shipping, etc. The summary of transaction details may be a text-string that corresponds to the transaction details, such as an amount of savings (e.g., in dollars and/or percentages), free shipping, warranty, expected availability, or whether the valid code is a personal valid code associated with the user, etc.

The browser extension may select at least one of the valid codes as at least one selected code based on a result of the testing the codes. For instance, the browser extension may perform a selection algorithm to select the at least one selected code, or display a summary of the valid codes to the user and receive a user input selecting the at least one selected code (such as depicted in FIG. 5C below). The selection algorithm may select a valid code that is a personal valid code associated with the user, a valid code that has a greatest savings, a valid code with a fastest estimated shipping, etc., or a combination thereof of benefits for the user. To display the summary of the valid codes to the user, the browser extension may organize or rank the valid codes and/or a summary of transaction details associated with the valid codes, and display the organized or ranked valid codes and/or the summary of transaction details. For instance, the browser extension may organize or rank the valid codes and/or the summary of transaction details from greatest perceived user benefit (e.g., greatest cost savings) to lowest perceived user benefit (e.g., least amount of cost savings). One of skill in the art would recognize that the valid code may not be necessarily limited to one code, but instead may be a combination of valid codes that combine to provide multiple benefits to the user, such as a first code that generates a discount on cost and second code that generates free shipping for the product.

The browser extension may determine a status of the session. For instance, the browser extension may determine whether the user has started a checkout process of the e-commerce website and/or whether the session is inactive. To determine whether the user has started the checkout process, the browser extension may monitor network requests to determine if a request for the checkout process was transmitted or the browser extension may monitor user inputs on graphical user elements associated with the checkout process to determine whether the graphical user elements were selected. Alternatively or additionally, the browser extension may determine whether the user is currently viewing a checkout page of the e-commerce website.

The browser extension may perform an action based on the status and the at least one selected code. For instance, the browser extension may, in response to determining that the user has not started the checkout process of the e-commerce website, display a summary of the valid codes to the user, and/or apply the selected code and display a summary of the applied selected code. For instance, as discussed below with respect to FIGS. 5A-5C, the browser extension may display a summary of available valid codes to the user, so that user may select one or more valid codes to be applied. To apply the selected code, the browser extension may first transmit a request to remove any codes already applied to the user's shopping cart. The browser extension may then transmit a request to apply the selected code to the user's shopping cart.

The browser extension may, in response to determining that the user has started the checkout process of the e-commerce website, display a menu to the user to apply the at least one selected code and/or display a summary of the valid codes to the user so that the user may select which valid code(s) to apply. Moreover, the browser extension may also display a reload button. The reload button may be selectable by a user input to cause the checkout process of the e-commerce website to reload and apply the at least one selected code.

In another aspect of the disclosure, the cart listeners may also monitor which webpages are being viewed by a user and determine a trigger condition based on specific user actions. The specific user actions may be making selections to view different configurations of a product, viewing a webpage for a threshold period of time, viewing reviews/comments of the product, etc. In this case, the browser extension may determine a likelihood of a user to add, delete, or modify an item to the user's shopping cart (e.g., a future shopping cart of the user), based on the specific user actions. If the determined likelihood of the user adding, deleting, or modifying an item, is above a threshold, then the browser extension may add, delete, or modify the item in the cloned shopping cart in the shadow session (modified cloned shopping cart), and perform the code testing process on the modified cloned shopping cart. The browser extension may then display a summary (discussed below with respect to FIG. 5A-5C) indicating that the product currently being viewed has valid codes available and/or the potential savings.

Therefore, the system of the present disclosure may allow for codes to be tested at the time an item is added to cart, or in some cases even before. The system of the present disclosure may, by trying codes automatically as the user's shopping cart changes before a user gets to checkout, allow for a faster checkout experience and/or create an incentive to complete a purchase if savings are available. Furthermore, the system of the present disclosure may, by using the new session and the cloned shopping cart, also avoids conflicts with the user's shopping cart, thereby reducing issues for users.

Figure 2:
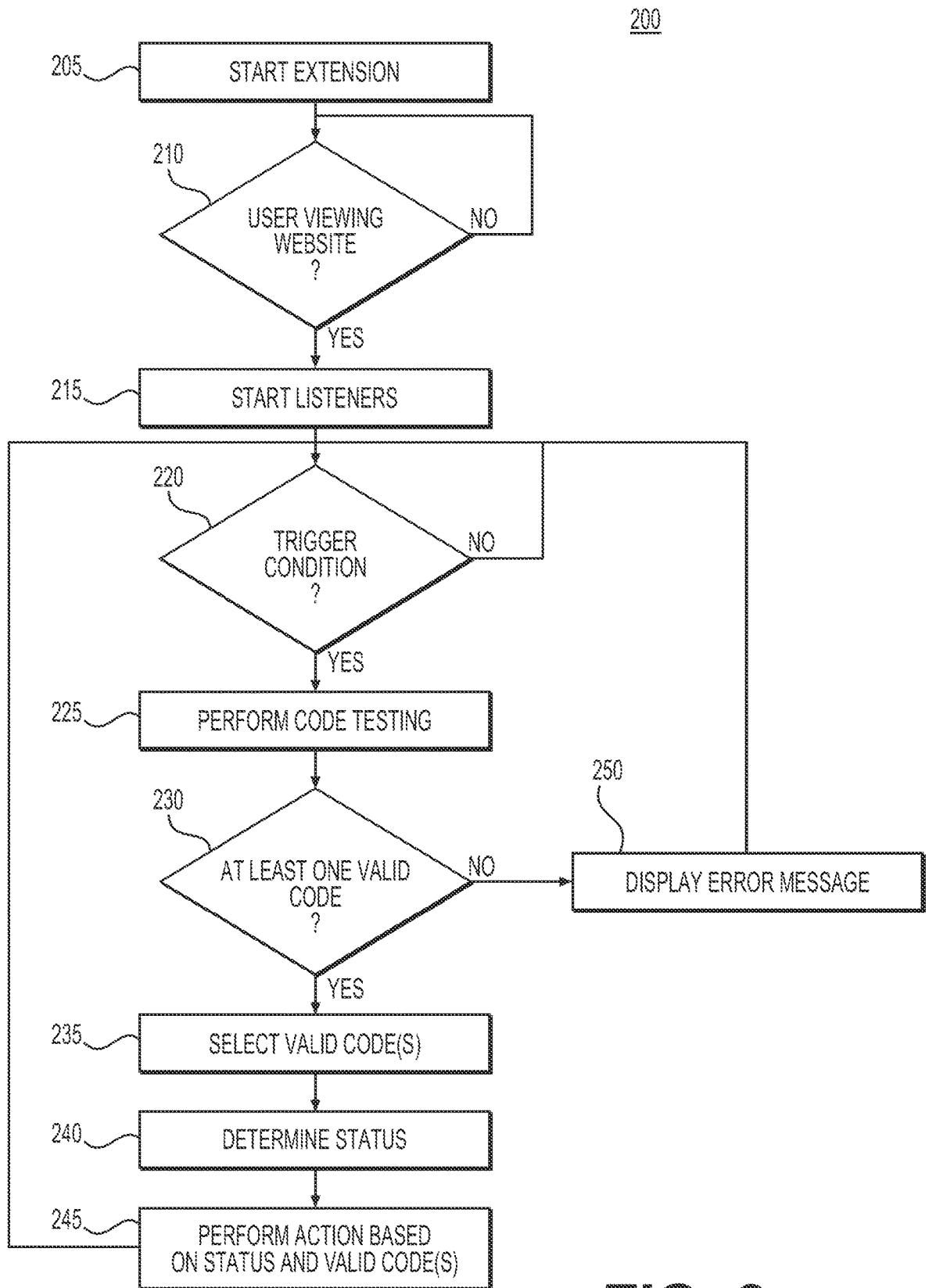
FIG. 2 depicts a flowchart for testing and applying codes to electronic shopping carts, according to one or more embodiments.

FIG. 2 depicts a flowchart 200 for testing and applying codes to electronic shopping carts, according to one or more embodiments. The flowchart 200 may be performed by the user device 105, discussed above, by executing the application. The user device 105 may start the process of the flowchart 200 by starting the browser extension (block 205). The browser extension may then proceed to determine whether a user of the user device 105 is viewing a website (block 210).

In response to determining that the user is not viewing the website (block 210: No), the browser extension may proceed to wait until the user is viewing the website (block 210). In response to determining that the user is viewing the website (block 210: Yes), the browser extension may proceed to start cart listeners (block 215).

The browser extension may then proceed to determine whether a trigger condition occurs (block 220). For instance, the cart listeners may notify the browser extension when a trigger condition occurs, as discussed above with respect to FIG. 1.

In response to determining that a trigger condition does not occur (block 220: No), the browser extension may proceed to wait until a trigger condition occurs (block 220). In response to determining that a trigger condition does occur (block 220: Yes), the browser extension may proceed to perform a code testing process (block 225). The browser extension may perform the code testing process in accordance with FIGS. 3 and 4, described below. The code testing process may return a result of the code testing process.

The browser extension may then proceed to determine whether there is at least one valid code (block 230). For instance, the browser extension may analyze the result of the code testing process, as discussed above with respect to FIG. 1, to determine if there are any valid codes.

In response to determining that there is not at least one valid code (block 230: No), the browser extension may, optionally, proceed to display an error message (block 250). The browser extension may then proceed to wait until a trigger condition occurs (block 220). In response to determining that there is at least one valid code (block 230: Yes), the browser extension may proceed to select at least one valid code as selected codes (block 235). For instance, the browser extension may select the at least one valid code as selected codes, as discussed above with respect to FIG. 1.

The browser extension may then proceed to determine a status of a session of the user (block 240). For instance, the browser extension may determine whether the user has started the checkout process, as discussed above with respect to FIG. 1.

The browser extension may then proceed to perform an action based on the status and the selected codes (block 245). For instance, the browser extension may display various summaries or menus to the user, based on the status and valid codes (if any), as discussed above with respect to FIG. 1. The browser extension may then proceed to wait until a trigger condition occurs (block 220).

Figure 3:
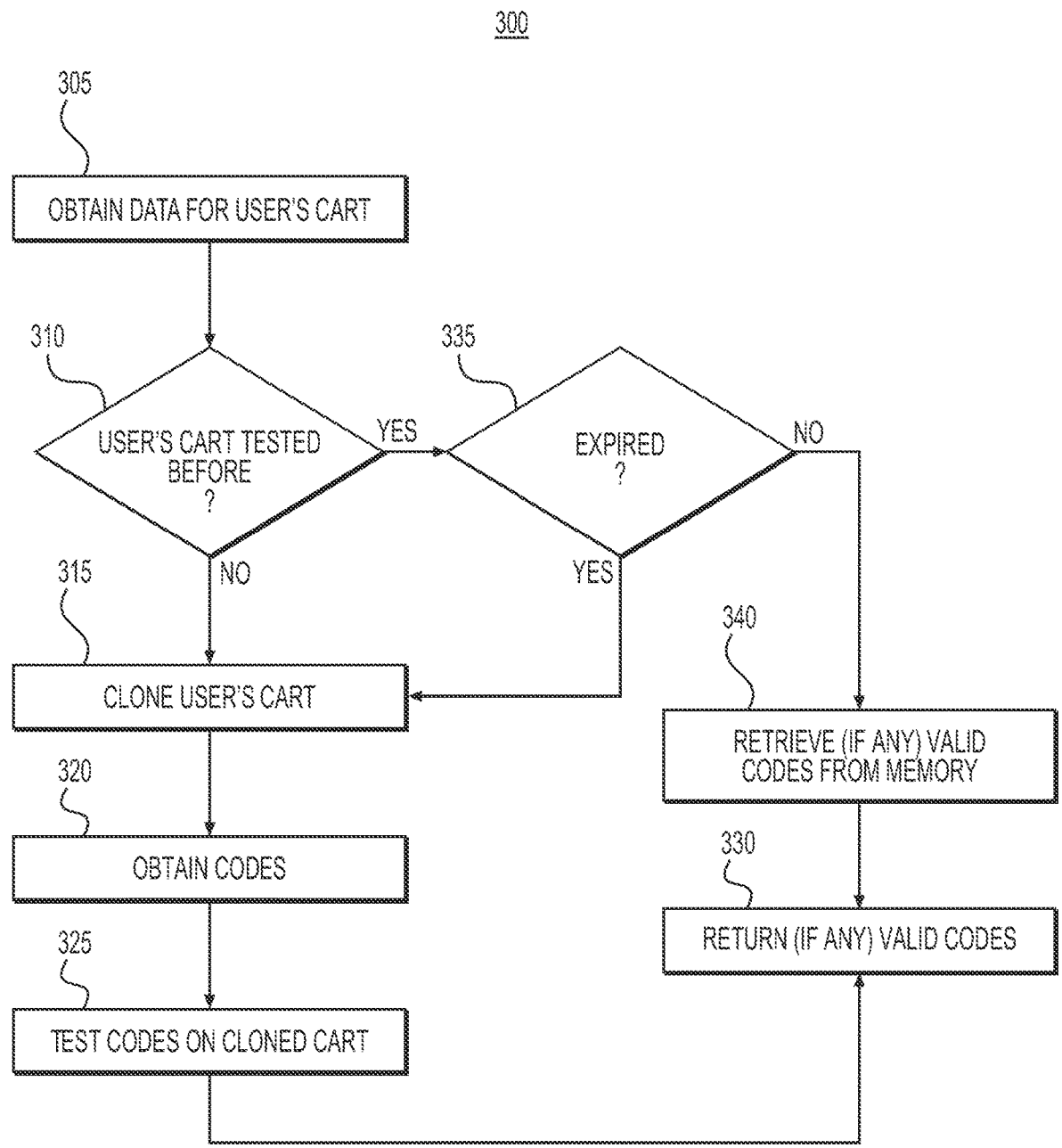
FIG. 3 depicts a flowchart for testing and applying codes to electronic shopping carts, according to one or more embodiments.

FIG. 3 depicts a flowchart 300 for testing and applying codes to electronic shopping carts, according to one or more embodiments. The flowchart 300 may be performed by the browser extension, discussed above, to perform the code testing process (e.g., block 225 of FIG. 2). The browser extension may start the process of the flowchart 300 by obtaining data for a user's shopping cart (block 305). The browser extension may then proceed to determine whether the user's shopping cart has been tested before (block 310). For instance, the browser extension may search the previously tested shopping cart configurations, as discussed above with respect to FIG. 1, to determine whether the user's shopping car has been tested before.

In response to determining that the user's shopping cart has not been tested before (block 310: No), the browser extension may proceed to clone the user's shopping cart to a cloned shopping cart (block 315). For instance, the browser extension may clone the user's shopping cart to the another shopping cart in the shadow session, as discussed above with respect to FIG. 1.

The browser extension may then proceed to obtain codes (block 320). For instance, the browser extension may obtain the code information from the server 115, as discussed above with respect to FIG. 1.

The browser extension may then proceed to test codes on the cloned shopping cart (block 325). The browser extension may perform the code testing process on the cloned shopping cart in accordance with FIG. 4, described below. The code testing process on the cloned shopping cart may return a result of code testing process on the cloned shopping cart.

The browser extension may then proceed to return, if any, valid codes (block 330). For instance, the browser extension may analyze the result of the code testing process on the cloned shopping cart, as discussed above with respect to FIG. 1, to determine if there are any valid codes to return and, if so, return the valid codes.

In response to determining that the user's shopping cart has been tested before (block 310: Yes), the browser extension may proceed to determine whether a cart expiration timer has expired (block 335). In response to determining that the cart expiration timer has expired (block 335: Yes), the browser extension may proceed to clone the user's shopping cart to a cloned shopping cart (block 315).

In response to determining that the cart expiration timer has not expired (block 335: No), the browser extension may proceed to retrieve, if any, valid codes from a memory (block 340). For instance, the browser extension may store results of previous cart testing for a predetermined period of time in the memory, and the browser extension may retrieve the stored results if the cart expiration timer has not expired. The browser extension may then proceed to return, if any, valid codes (block 330).

Figure 4:
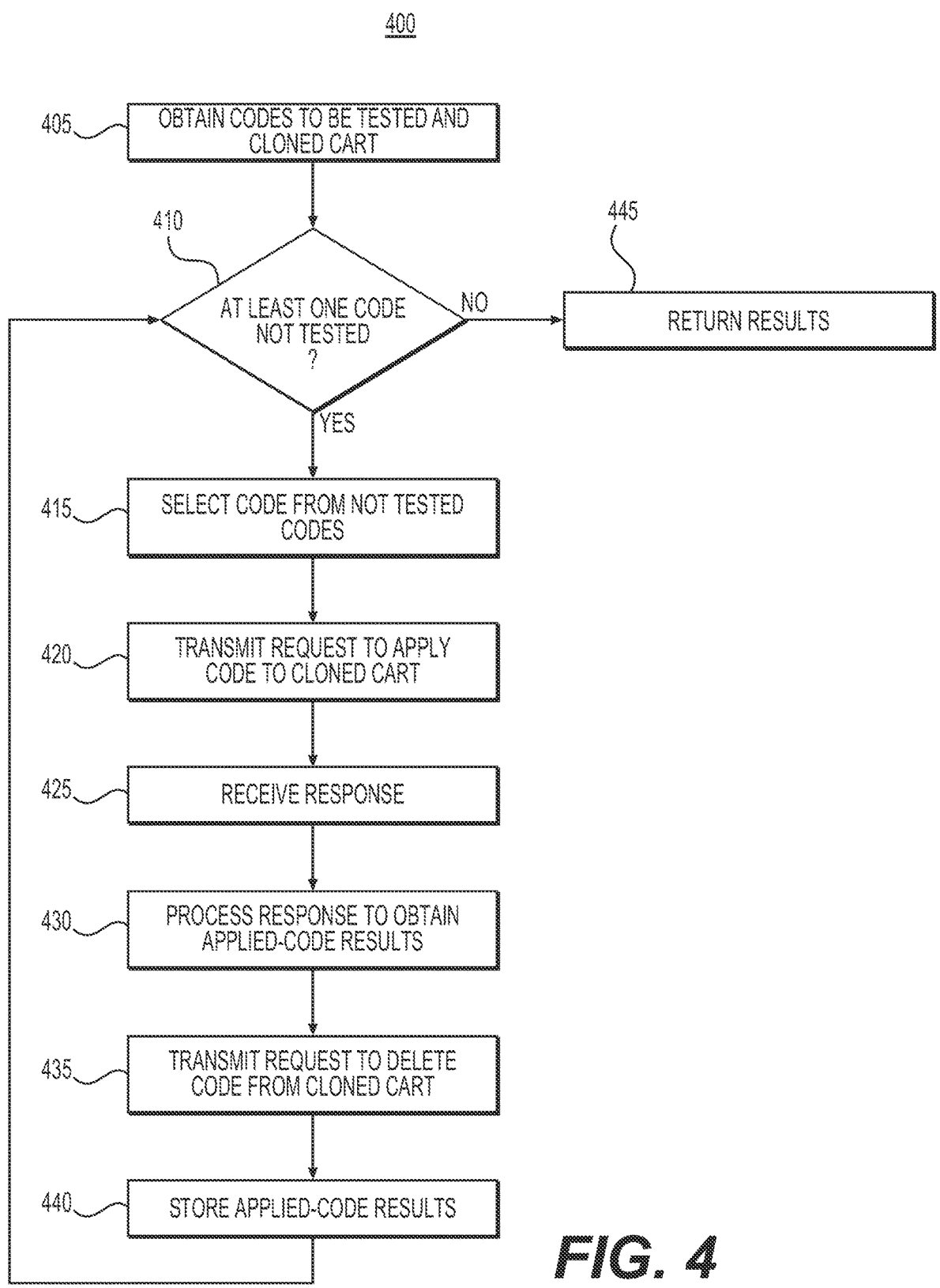
FIG. 4 depicts a flowchart for testing and applying codes to electronic shopping carts, according to one or more embodiments.

FIG. 4 depicts a flowchart 400 for testing and applying codes to electronic shopping carts, according to one or more embodiments. The flowchart 400 may be performed by the browser extension, discussed above, to perform the code testing process on the cloned shopping cart (e.g., block 325 of FIG. 3). The browser extension may start the process of the flowchart 400 by obtaining codes to be tested and the cloned shopping cart (block 405). The browser extension may then proceed to determine whether at least one code of the codes has not been tested (block 410).

In response to determining that all of the codes have been tested (block 410: No), the browser extension may proceed to return the results of the code testing process (block 445).

In response to determining that at least one code has not been tested (block 410: Yes), the browser extension may proceed to select a code from the not tested codes (block 415). For instance, the browser extension may perform the selection algorithm to select the at least one selected code, or display the summary of the valid codes to the user, as discussed above with respect to FIG. 1.

The browser extension may then proceed to transmit, to an e-commerce website associated with the cloned shopping cart, a request to apply the selected code to the cloned shopping cart (block 420). For instance, the browser extension may generate the request and transmit the generated request, as discussed above with respect to FIG. 1. The browser extension may then proceed to receive a response from the e-commerce website (block 425).

The browser extension may then proceed to process the response to obtain applied-code results (block 430). For instance, the browser extension may process the response, as discussed above with respect to FIG. 1.

The browser extension may then proceed to transmit a request, to the e-commerce website, to delete the code from the cloned shopping cart (block 435). For instance, the browser extension may transmit the request to delete the code, as discussed above with respect to FIG. 1. The browser extension may then proceed to store the applied-code results in a memory (block 440). For instance, the browser extension may store the applied-code results, as discussed above with respect to FIG. 1.

The browser extension may then proceed to return to determine whether at least one code has not been tested (block 410). In this manner, each code of the codes may be tested with respect to the cloned shopping cart. One skilled in the art may recognize that the flowchart 400 may be performed in parallel for each code of the codes or in various different modes and sequences based on resources and network constraints. For instance, the code testing process may be performed by distributed computing by having the server 115 and/or other user devices perform the code testing process for the cloned shopping cart using duplicated cloned shopping carts and shadow sessions so as test multiple codes at a same time; alternatively the user device 105 may generate multiple shadow sessions and cloned shopping carts so as test multiple codes at a same time. Additionally or alternatively, not all of the codes may be tested due to, e.g., time constraints, and the codes that are selected to be tested may be selected in accordance with a code testing selection algorithm. For instance, the code testing selection algorithm may select codes that have a highest likelihood to return valid (e.g., based on the codes successfully being used), and/or in order of potential benefits (e.g., largest savings, etc.).

Figure 5A:
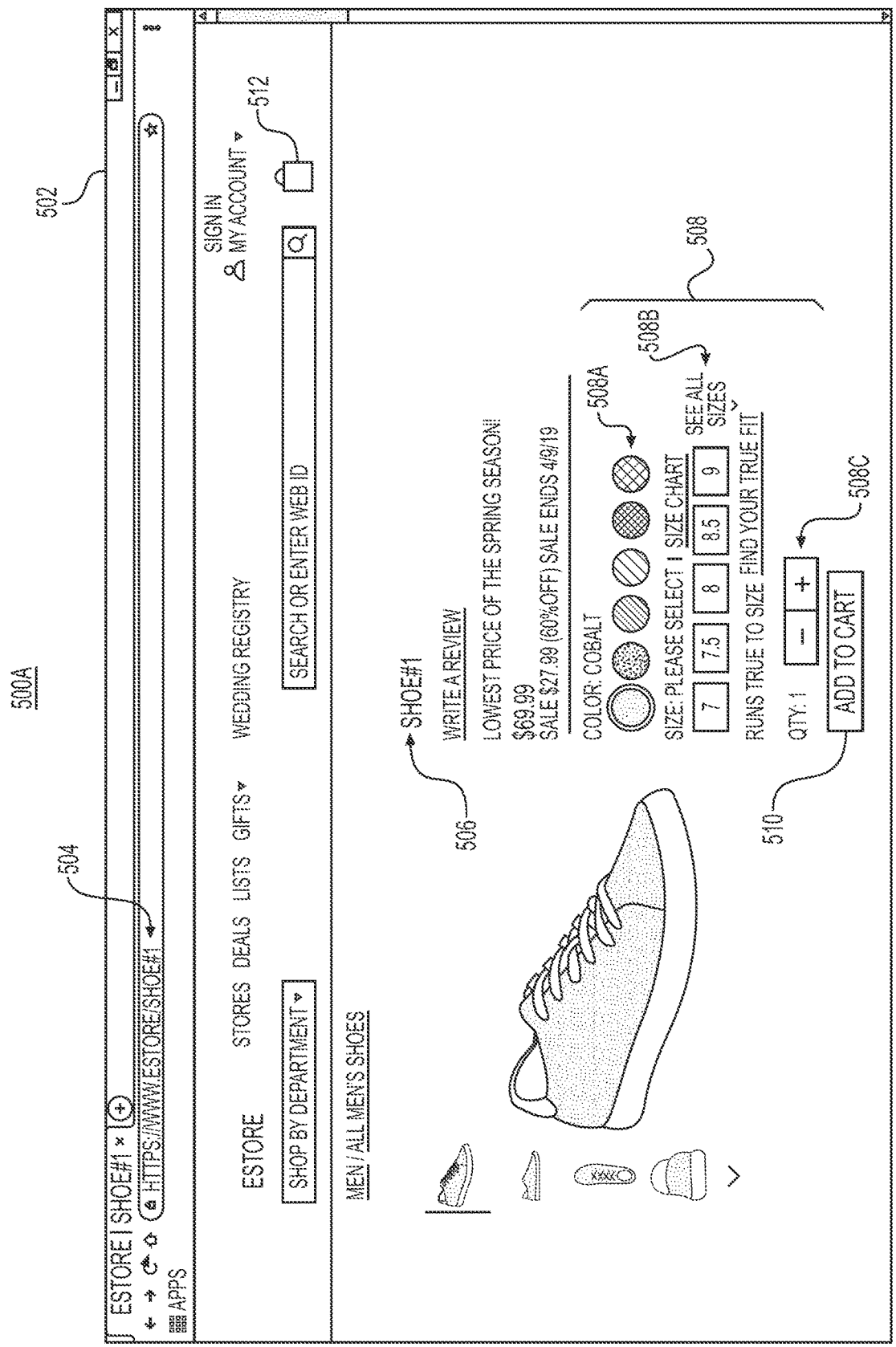
FIGS. 5A-5C depict graphical user interfaces (GUIs) for testing and applying codes to electronic shopping carts, according to one or more embodiments.
Figure 5B:
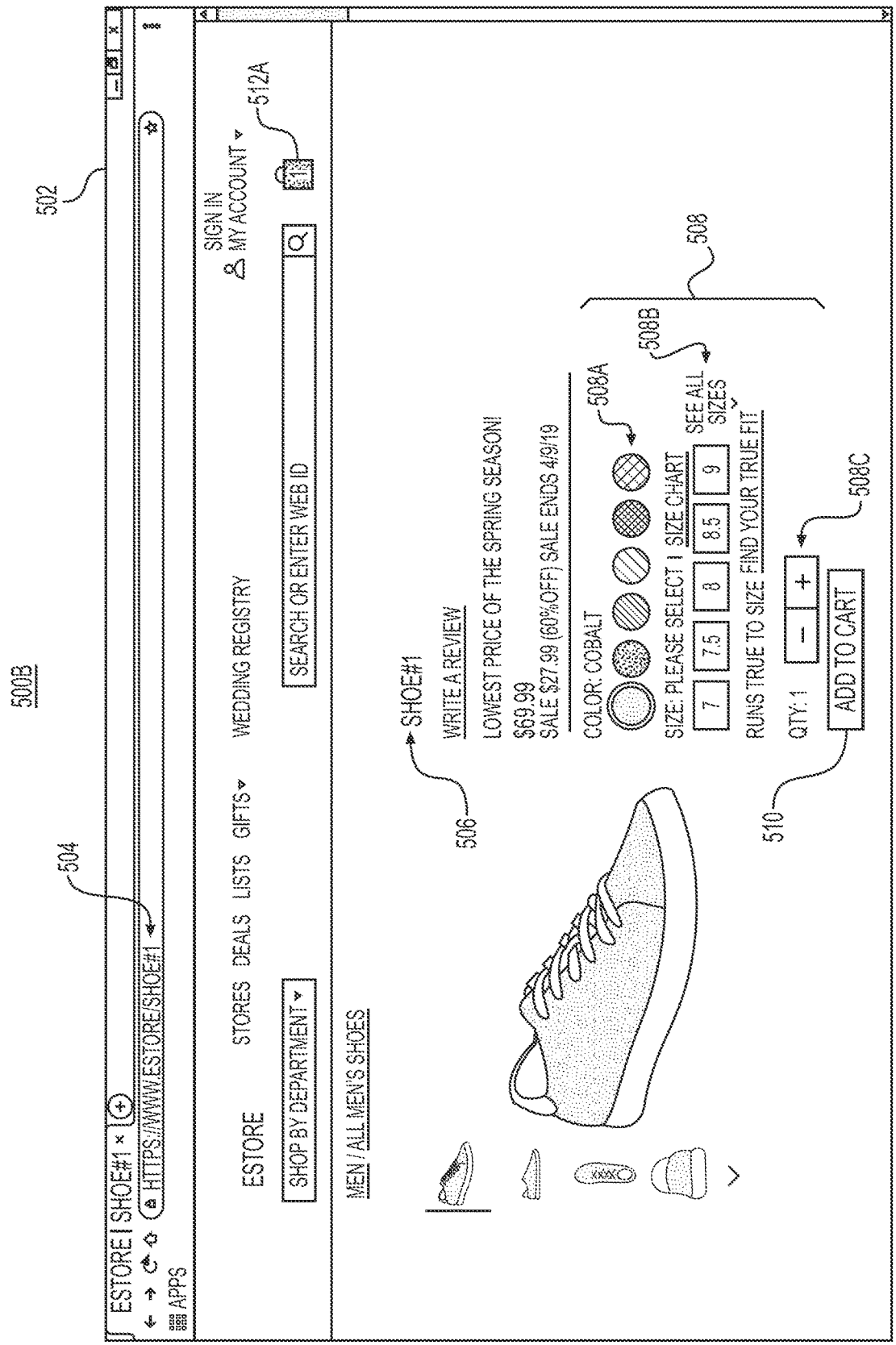
Figure 5C:
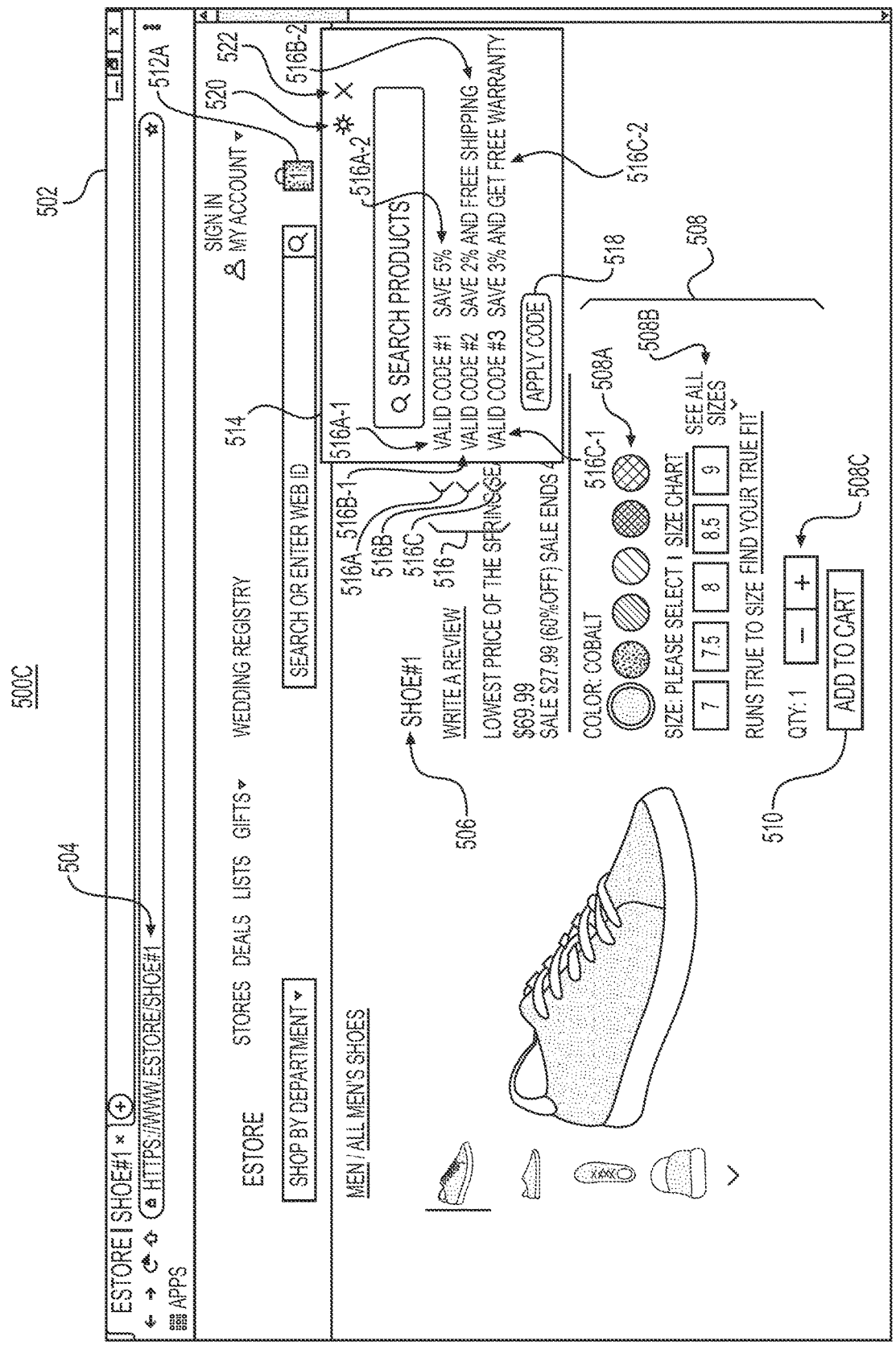

FIGS. 5A-5C depict graphical user interfaces (GUIs) 500A-500C for testing and applying codes to electronic shopping carts, according to one or more embodiments. GUI 500A may depict a webpage 502 of an e-commerce website hosted by one of the plurality of e-commerce servers 120A and 120B. The e-commerce website 502 may be identified by a uniform resource locator (URL) 504. The webpage 502 may be for a product 506 (e.g., a shoe, etc.) offered for sale, lease, loan, etc. with various options 508, such as color 508A, size 508B, and/or quantity 508C. One skilled in the art would recognize that the various options 508 would be specific to the type of product being offered for sale, lease, loan, etc. The various options may be selectable by a user input to adjust the product 506, so the user may view different configurations of the product and/or availability, etc. The webpage 502 may also have an add to shopping cart element 510. The add to shopping cart element 510 may be selectable by a user input to add a currently configured product to a user's shopping cart. The webpage 502 may display a status 512 of a user's shopping cart. As displayed in the GUI 500A of FIG. 5A, the status 512 of the user's shopping cart indicates that the user has no items in the user's shopping cart.

The browser extension, discussed above, may determine that the user is currently viewing the webpage 502, as discussed in FIG. 1. The browser extension may have set up the cart listeners already; may set up the cart listeners in response to determining that the user is currently viewing the webpage 502; or may set up the cart listeners after the user has added one or more items to the user's shopping cart. For instance, the browser extension may dynamically determine when to set up the cart listeners based on statistical analysis of previous user interactions with e-commerce website(s).

GUI 500B may depict the webpage 502 after a user has added an item to the user's shopping cart, by e.g., selecting the add to shopping cart element 510 by a user input. As depicted in the GUI 500B of FIG. 5B, the webpage 502 may display an updated status 512A. As discussed above, the cart listeners may have detected the change to the user's shopping cart by, e.g., listening to a request sent from the user device 105 to one of the e-commerce servers 120A and 120B or listening to the user input on the add to shopping cart element 510.

The browser extension may perform the code testing, as discussed above with respect to FIG. 1 and/or FIGS. 2-4 to determine valid codes (if any) for the product added to the user's shopping cart. GUI 500C may depict the webpage 502 after the browser extension has performed the code testing process. As discussed above, the browser extension may display a menu and/or summary on the webpage 502, based on a status of the session of the user. As depicted in the GUI 500C of FIG. 5C, the browser extension may display a summary 514. The summary 514 may be displayed as a menu, a pop-up, a notification, etc. As depicted in the GUI 500C of FIG. 5C, the summary 514 may be a pop-up with a close icon 522 and setting link element 520. The close icon may be selectable by a user input to close the summary 514. The setting link element 520 may selectable by a user input to go a settings menu/webpage of the browser extension.

The summary 514 may display zero, one, or a plurality of valid codes 516, based on the code testing process performed by the browser extension. For instance, as displayed in the GUI 500C of FIG. 5C, the summary 514 may display three valid codes, including a first valid code 516A, a second valid code 516B, a third valid code 516C. The browser extension may select the displayed valid codes according to a valid code display selection algorithm. For instance, the valid code display selection algorithm may select valid codes with greatest savings, fastest shipping, free shipping, included free warranties, and/or other transaction details, such as expected availability, and whether the valid code is a personal valid code associated with the user, etc. (collectively, transaction details).

Furthermore, the summary 514 may include a link (not depicted) to more valid codes, for instance if a number of valid codes exceeds a threshold number of valid codes. The threshold number of valid codes (1) may be set by the browser extension, (2) may be set by a user input, and/or (3) may be determined based on, e.g., display format of the webpage 502 and/or the display/UI 105A of the user device 105.

The valid codes 516 may display an identifier 516A-1 to 516C-1 and/or a summary of results 516A-2 to 516C-2 for each valid code. The identifier 516A-1 to 516C-1 may be a text string corresponding to the valid code, such as a text string to be entered to obtain the discount, free shipping, etc.

The summary of results 516A-2 to 516C-2 may be a text-string that corresponds to the transaction details, such as an amount of savings (e.g., in dollars and/or percentages), free shipping, warranty, expected availability, whether the valid code is a personal valid code associated with the user, etc.

The summary 514 may also display an apply code element 518. The apply code element 518 may be selectable by a user input to apply a default valid code to the user's shopping cart. The default valid code may be a first valid code listed in the summary 514, a valid code that is a personal valid code associated with the user, a valid code that has a greatest savings, a valid code with a fastest estimated shipping, etc. Additionally or alternatively, the apply code element 518 may apply a code selected by a user by, e.g., selecting one of the displayed valid codes and then selecting the apply code element 518.

Alternatively or additionally, the browser extension may automatically apply the default valid code to the user's shopping cart. The browser extension may also display, in the summary 514 instead of the valid codes 516, an identifier and summary for the default valid code that was applied and/or an indication of a number codes tested and/or a number of valid codes.

Figure 6:
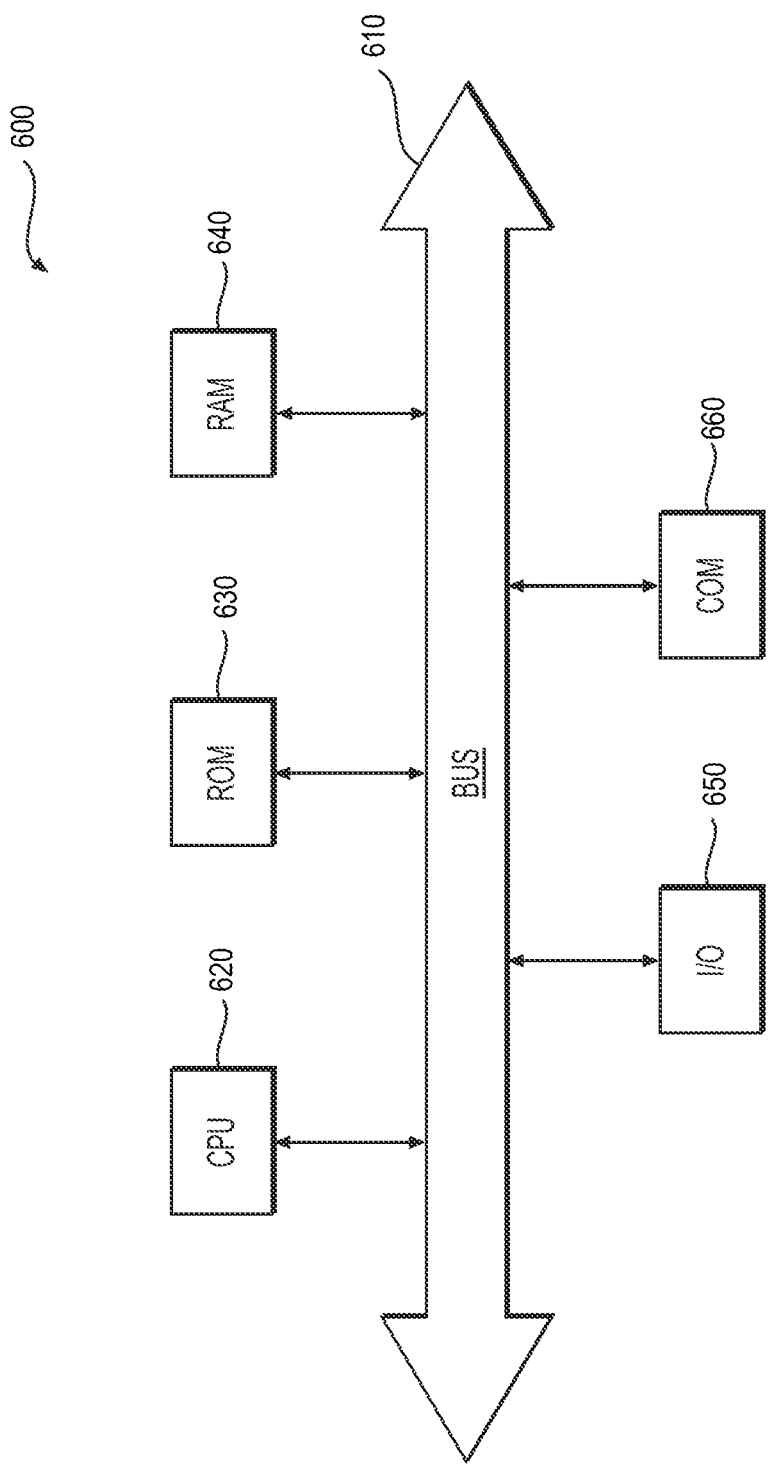
FIG. 6 depicts an example system that may execute techniques presented herein.

FIG. 6 depicts an example system that may execute techniques presented herein. FIG. 6 is a simplified functional block diagram of a computer that may be configured to execute techniques described herein, according to exemplary embodiments of the present disclosure. Specifically, the computer (or "platform" as it may not a be a single physical computer infrastructure) may include a data communication interface 660 for packet data communication. The platform may also include a central processing unit ("CPU") 620, in the form of one or more processors, for executing program instructions. The platform may include an internal communication bus 610, and the platform may also include a program storage and/or a data storage for various data files to be processed and/or communicated by the platform such as ROM 630 and RAM 640, although the system 600 may receive programming and data via network communications. The system 600 also may include input and output ports 650 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for testing and applying codes to electronic shopping carts performed by one or more processors executing a software application for accessing websites, the method comprising:
    monitoring a shopping cart associated with an e-commerce website and with a user, the shopping cart being associated with a session of the user;
    cloning the shopping cart to form a cloned shopping cart in a shadow session using a present content of the shopping cart;
    monitoring which webpages are being viewed by the user and determining whether a trigger condition is satisfied based on specific actions, the specific actions including adding, deleting, or modifying a first item in a user's shopping cart;
    in response to determining the trigger condition is satisfied, determining a likelihood of the user to add, delete, or modify a second item to the shopping cart based on the specific actions;
    in response to the likelihood of the user adding, deleting, or modifying a second item being above a threshold, adding, deleting, or modifying the second item in the cloned shopping cart to obtain a modified cloned shopping cart;
    testing codes on the modified cloned shopping cart by:
        obtaining the codes; and
        testing the codes on the modified cloned shopping cart in the shadow session to determine valid codes;
    selecting at least one of the valid codes as at least one selected code based on a result of the testing the codes; and
    displaying a summary indicating that the second item has valid codes available and/or potential savings based on the result of the testing the codes.

2. The method of claim 1, wherein testing the codes on the modified cloned shopping cart to determine the valid codes includes:
    obtaining data for the shopping cart;
    determining the present content of the shopping cart based on the data;
    determining whether the present content has been tested before; and
    in response to determining the present content has been tested before, retrieving the valid codes from a memory.

3. The method of claim 1, wherein selecting the at least one of the valid codes as the at least one selected code based on the result of the testing the codes includes:
    performing a selection algorithm to select the at least one selected code.

4. The method of claim 1, wherein testing the codes on the modified cloned shopping cart to determine the valid codes includes:
    determining whether at least one code of the codes has not been tested;
    in response to determining that the at least one code of the codes has not been tested, selecting a code of the at least one code that has not been tested; and
    applying the code to the modified cloned shopping cart to determine whether the code is a valid code.

5. The method of claim 4, wherein applying the code to the modified cloned shopping cart to determine whether the code is the valid code includes:
    transmitting a request to apply the code to the modified cloned shopping cart to the e-commerce website;
    receiving a response from the e-commerce website; and
    processing the response from the e-commerce website to determine whether the code is the valid code.

6. The method of claim 5, wherein processing the response from the e-commerce website to determine whether the code is the valid code includes:
    parsing marked-up data and/or formatted data of the response;
    extracting transaction data from the marked-up data and/or the formatted data; and
    determining transaction results based on the transaction data, the transaction results including information indicating whether the code is the valid code.

7. The method of claim 6, wherein when the information indicates the code is the valid code, the transaction results further include one or more of additional information regarding discounts, shipping information, or other transaction details.

8. The method of claim 1, wherein selecting the at least one of the valid codes as the at least one selected code based on the result of the testing the codes includes:
    displaying a summary of the valid codes to the user and receiving a user input selecting the at least one selected code.

9. The method of claim 1, further comprising:
    determining a status of a current session of the shopping cart, by determining whether the user has started a checkout process of the e-commerce website;
    performing an action based on the status and the at least one selected code, the action including:
        in response to determining that the user has not started the checkout process of the e-commerce website, displaying a summary of the valid codes to the user, or
        in response to determining that the user has started the checkout process of the e-commerce website, displaying a menu to the user to apply the at least one selected code.

10. The method of claim 9, wherein displaying the menu to the user to apply the at least one selected code includes:
    displaying a reload button in the menu; and
    in response to receiving a user input associated with the reload button, causing the checkout process of the e-commerce website to reload and apply the at least one selected code.

11. A system for testing and applying codes to electronic shopping carts performed by one or more processors executing a software application for accessing websites, the system comprising:
    a memory storing instructions; and
    a processor executing the instructions to perform a process including:
        determining whether a user is viewing an e-commerce website;
        in response to determining that the user is viewing the e-commerce website, setting up cart listeners;
        using the cart listeners, monitoring a shopping cart associated with the e-commerce website and with a user, the shopping cart being associated with a session of the user;

cloning the shopping cart to form a cloned shopping cart in a shadow session using a present content of the shopping cart;

monitoring which webpages are being viewed by the user and determining whether a trigger condition is satisfied based on specific actions, the specific actions including adding, deleting, or modifying a first item in a user's shopping cart;

in response to determining the trigger condition is satisfied, determining a likelihood of the user to add, delete, or modify a second item to the shopping cart based on the specific actions;

in response to the likelihood of the user adding, deleting, or modifying a second item being above a threshold, adding, deleting, or modifying the second item in the cloned shopping cart to obtain a modified cloned shopping cart;

testing codes on the modified cloned shopping cart by:
   obtaining the codes; and
   testing the codes on the modified cloned shopping cart in the shadow session to determine valid codes;

selecting at least one of the valid codes as at least one selected code based on a result of the testing the codes; and displaying a summary indicating that the second item has valid codes available and/or potential savings based on the result of the testing the codes.

12. The system of claim 11, wherein testing the codes on the modified cloned shopping cart to determine the valid codes includes:
   obtaining data for the shopping cart;
   determining the present content of the shopping cart based on the data;
   determining whether the present content has been tested before; and
   in response to determining the present content has been tested before, retrieving the valid codes from the memory.

13. The system of claim 12, wherein selecting the at least one of the valid codes as the at least one selected code based on the result of the testing the codes includes:
   performing a selection algorithm to select the at least one selected code.

14. The system of claim 11, wherein testing the codes on the modified cloned shopping cart to determine the valid codes includes:
   determining whether at least one code of the codes has not been tested;
   in response to determining that the at least one code of the codes has not been tested, selecting a code of the at least one code that has not been tested; and
   applying the code to the modified cloned shopping cart to determine whether the code is a valid code.

15. The system of claim 14, wherein applying the code to the modified cloned shopping cart to determine whether the code is the valid code includes:
   transmitting a request to apply the code to the modified cloned shopping cart to the e-commerce website;
   receiving a response from the e-commerce website; and
   processing the response from the e-commerce website to determine whether the code is the valid code.

16. The system of claim 15, wherein processing the response from the e-commerce website to determine whether the code is the valid code includes:
   parsing marked-up data and/or formatted data of the response;
   extracting transaction data from the marked-up data and/or the formatted data; and
   determining transaction results based on the transaction data, the transaction results including information indicating whether the code is the valid code.

17. The system of claim 11, wherein selecting the at least one of the valid codes as the at least one selected code based on the result of the testing the codes includes:
   displaying a summary of the valid codes to the user and receiving a user input selecting the at least one selected code.

18. The system of claim 11, further comprising:
   determining a status of a current session of the shopping cart, by determining whether the user has started a checkout process of the e-commerce website;
   performing an action based on the status and the at least one selected code, the action including:
      in response to determining that the user has not started the checkout process of the e-commerce website, displaying a summary of the valid codes to the user, or
      in response to determining that the user has started the checkout process of the e-commerce website, displaying a menu to the user to apply the at least one selected code.

19. The system of claim 18, wherein displaying the menu to the user to apply the at least one selected code includes:
   displaying a reload button in the menu; and
   in response to receiving a user input associated with the reload button, causing the checkout process of the e-commerce website to reload and apply the at least one selected code.

20. A method for testing and applying codes to electronic shopping carts performed by one or more processors executing a software application for accessing websites, the method comprising:
   determining whether a user is viewing an e-commerce website;
   in response to determining that the user is viewing the e-commerce website, setting up cart listeners;
   using the cart listeners, monitoring a shopping cart associated with the e-commerce website and with a user, the shopping cart being associated with a session of the user;
   cloning the shopping cart to form a cloned shopping cart in a shadow session using a present content of the shopping cart;
   monitoring which webpages are being viewed by the user and determining whether a trigger condition is satisfied based on specific actions, the specific actions including adding, deleting, or modifying a first item in a user's shopping cart;
   in response to determining the trigger condition is satisfied, determining a likelihood of the user to add, delete, or modify a second item to the shopping cart based on the specific actions;
   in response to the likelihood of the user adding, deleting, or modifying a second item being above a threshold, adding, deleting, or modifying the second item in the cloned shopping cart to obtain a modified cloned shopping cart;
   testing codes on the modified cloned shopping cart by:
      obtaining the codes; and
      testing the codes on the modified cloned shopping cart in the shadow session to determine valid codes;

selecting at least one of the valid codes as at least one selected code based on a result of the testing the codes; and displaying a summary indicating that the second item has valid codes available and/or potential savings based on the result of the testing the codes.

\* \* \* \* \*